US00RE42346E

(19) United States
(12) Reissued Patent
Rombach et al.

(10) Patent Number: US RE42,346 E
(45) Date of Reissued Patent: May 10, 2011

(54) SOLID STATE SILICON-BASED CONDENSER MICROPHONE

(75) Inventors: Pirmin Rombach, Lyngby (DK); Matthias Müllenborn, Lyngby (DK); Ole Hansen, Horsholm (DK); Matthias Heschel, Rødovre (DK); Siebe Bouwstra, Amsterdam (NL); Maja Amskov Gravad, Tune (DK); Henrick Laurids Hvims, Holte (DK); Jørgen B. Elmer, legal representative, Hørshølm (DK)

(73) Assignee: Epcos PTE Ltd., Singapore (SG)

(21) Appl. No.: 10/193,055

(22) Filed: Jul. 11, 2002
(Under 37 CFR 1.47)

Related U.S. Patent Documents

Reissue of:
(64) Patent No.: 6,088,463
Issued: Jul. 11, 2000
Appl. No.: 09/182,668
Filed: Oct. 30, 1998

(51) Int. Cl.
*H04R 25/00* (2006.01)

(52) U.S. Cl. ..... 381/174; 381/175; 381/191; 367/174; 367/181

(58) Field of Classification Search ..... 381/173–175, 381/176, 178, 179, 191; 367/170–174, 181; 438/53; 29/594, 603.18; 361/283.3, 283.4; 73/715, 718
See application file for complete search history.

(56) References Cited

U.S. PATENT DOCUMENTS

| | | | | |
|---|---|---|---|---|
| 4,922,471 A | | 5/1990 | Kuehnel | 367/181 |
| 5,146,435 A | | 9/1992 | Bernstein | 367/181 |
| 5,255,246 A | | 10/1993 | van Halteren | 367/170 |
| 5,303,210 A | * | 4/1994 | Bernstein | 381/174 |
| 5,452,268 A | | 9/1995 | Bernstein | 367/181 |
| 5,490,220 A | | 2/1996 | Loeppert | 381/168 |
| 5,531,787 A | | 7/1996 | Lesinski et al. | 623/10 |
| 5,573,679 A | | 11/1996 | Mitchell et al. | 216/56 |

(Continued)

FOREIGN PATENT DOCUMENTS

DE 33 25 961 A 1/1985

(Continued)

OTHER PUBLICATIONS

Bay, Jesper, et al., "Design Of A Silicon Microphone With Differential Read-Out Of A Sealed Double Parallel-Plate Capacitor," Sensors and Actuators A, vol. 53, pp. 232-236 (1996).

(Continued)

*Primary Examiner* — Suhan Ni
(74) *Attorney, Agent, or Firm* — Nixon Peabody LLP

(57) ABSTRACT

A solid state silicon-based condenser microphone comprising a silicon transducer chip (1). The transducer chip includes a backplate (13) and a diaphragm (12) arranged substantially parallel to each other with a small air gap in between, thereby forming an electrical capacitor. The diaphragm (12) is movable relative to the backplate (13) in response to incident sound. An integrated electronic circuit chip (3) or ASIC is electrically coupled to the transducer chip (1). An intermediate layer (2) fixes the transducer chip (1) to the integrated electronic circuit chip (3) with the transducer chip (1) on a first side of the intermediate layer (2) and the integrated electronic circuit chip (3) on a second side of the intermediate layer (2) opposite the first side. The intermediate layer (2) has a sound inlet (4) on the same side as the ASIC giving access of sound to the diaphragm.

16 Claims, 1 Drawing Sheet

U.S. PATENT DOCUMENTS

| | | | | |
|---|---|---|---|---|
| 5,658,710 | A | 8/1997 | Neukermans | 430/320 |
| 5,659,195 | A | 8/1997 | Kaiser et al. | 257/415 |
| 5,677,965 | A | 10/1997 | Moret et al. | 381/191 |
| 5,717,631 | A | 2/1998 | Carley et al. | 365/174 |
| 5,740,258 | A | 4/1998 | Goodwin-Johansson | 381/72 |
| 5,870,482 | A | 2/1999 | Loeppert et al. | 381/174 |
| 5,970,315 | A | 10/1999 | Carley et al. | 438/52 |
| 6,178,249 | B1 * | 1/2001 | Hietanen et al. | 381/174 |
| 6,806,593 | B2 * | 10/2004 | Tai et al. | 381/191 |

FOREIGN PATENT DOCUMENTS

| | | | |
|---|---|---|---|
| DE | 3325961 | | 1/1985 |
| EP | 0 490 486 | | 6/1992 |
| EP | 0 490 486 | A2 | 6/1992 |
| EP | 0 561 566 | | 9/1993 |
| EP | 0 561 566 | A2 | 9/1993 |
| EP | 0 783 108 | | 7/1997 |
| EP | 0 783 108 | A1 | 7/1997 |
| JP | 09037382 | | 2/1997 |
| JP | 9037382 | A | 2/1997 |
| WO | WO 93/19343 | | 9/1993 |
| WO | 94/25863 | | 11/1994 |
| WO | WO 94/25863 | | 11/1994 |
| WO | WO 94/30030 | | 12/1994 |
| WO | 95/34917 | | 12/1995 |
| WO | WO 95/34917 | | 12/1995 |
| WO | 97/01258 | | 1/1997 |
| WO | WO 97/01258 | | 1/1997 |

OTHER PUBLICATIONS

Bouwstra, Siebe, et al., "Silicon Microphones—A Danish Perspective," J. Micromech. Microeng., vol. 8, pp. 64-68 (1998).

Chowdhury, Sazzadur, et al., "MEMS Acousto-Magnetic Components For Use In A Hearing Instrument," Presentation at SPIE's Symposium on Design, Test, Integration, and Packaging of MEMS/MOEMS, 14 pages (May 9-11, 2000).

Dehé, A., et al., "Silicon Micromachined Microphone Chip At Siemens," 4 pages (no date).

van der Donk, A.G.H., et al., "Preliminary Results Of A Silicon Condenser Microphone With Internal Feedback," IEEE, pp. 262-265 (1991).

Emkay Innovative Products, Brochure for "SiSonic™ Silicon Microphone," 2 pages (no date).

Emkay Innovative Products, "Surface Mount Microphones: A New Options for OEMs," EPN, 2 pages (Jun. 11, 2002).

Emkay Innovative Products, Press Release for "Advancement In Silicon Technology Leads To Partnership With Institute Of Microelectronics—Singapore," 2 pages (Jan. 9, 1998).

Hsu, P.-C, et al., "A High Sensitivity Polysilicon Diaphragm Condenser Microphone," Presentation at MEMS Conference, 6 pages (Jan. 25-29, 1998).

Müllenborn, Matthias, "Microsystems For Hearing Instruments," Micro Structure Bulletin, No. 3, 1 page (Aug. 1998).

Ouellette, Jennifer, "The Incredible Shrinking Microphone," The Industrial Physicist, 3 pages (Aug. 1999).

Scheeper, P. R., et al., "Fabrication Of Silicon Condenser Microphones Using Single Wafer Technology," Journal Of Microelectromechanical Systems, vol. 1, No. 3, pp. 147-154 (Sep. 1992).

SonionMEMS, Brochure for Silicon Microphone, 4 pages (no date).

* cited by examiner

SOLID STATE SILICON-BASED CONDENSER MICROPHONE

Matter enclosed in heavy brackets [ ] appears in the original patent but forms no part of this reissue specification; matter printed in italics indicates the additions made by reissue.

*RELATED APPLICATIONS*

*Notice: More than one reissue application has been filed for the reissue of U.S. Pat. No. 6,088,463. The reissue applications are application Ser. No. 10/193,055 (present application), filed Jul. 11, 2002, and application Ser. No. 11/903,207, filed Sep. 20, 2007, which are divisional reissues of U.S. Pat. No. 6,088,463, issued Jul. 11, 2000.*

FIELD OF THE INVENTION

This invention related to miniature condenser microphones, and in particular to solid state silicon-based condenser microphones incorporating an integrated electronic circuit for transducer signal conditioning. Such miniature microphones are suitable for use in miniature electroacoustic devices such as hearing instruments.

BACKGROUND OF THE INVENTION

In the hearing instruments industry one of the primary goals is to make hearing instruments of small size while still maintaining good electroacoustic performance and operability giving good user friendliness and satisfaction. Technical performance data comprise such as sensitivity, stability, compactness, robustness and insensitivity to electromagnetic interference and to other external and environmental conditions. In the past, several attempts have been made to make microphones smaller while still maintaining good technical performance data.

EP 561 566 discloses a solid state condenser microphone having a transducer chip and, on the same chip, an electronic circuit and a cavity forming an opening or sound inlet for the transducer. The techniques and processes for manufacturing such electronic circuitry are quite different from the techniques and processes used in manufacturing the transducer elements. Consequently a chip having both an electronic circuit and an opening therein requires two (or possibly more) separate stages of production, usually at different facilities.

SUMMARY OF THE INVENTION

The invention provides a solid state silicon-based condenser microphone which is suitable for batch production. Several silicon chips are stacked, and the subsequent [dicinig] *dicing* of the stacked chips or discs is easier than with the prior art.

The invention makes it possible to make a very well defined sound inlet, which can optionally be covered with a sealing film or a filter preventing dust, moisture and other impurities from contaminating or obstructing the interior and the sound inlet of the microphone. A sound inlet can theoretically be made as an opening in any of the chip surfaces including the fractures after dicing, but in practice the fractures are irregular surfaces and therefore less suitable for supporting a sealing film or a filter, since the irregular fractures could give rise to the sealing film or a filter becoming wrinkled and having leakages at its periphery where it is secured to the die surface.

A microphone according to the invention has an opening forming a sound inlet in the practically perfectly flat and polished faces of the wafer on which several individual microphones are arranged.

An integrated electronic circuit chip can be arranged on the same plane surface, which is perfectly suited for flip-chip mounting the electronic circuit chip.

An intermediate chip is arranged between the electronic circuit chip and the transducer chip. The intermediate chip has another opening with feedthrough electrical connections on a surface of the opening. The feedthrough connections establish electrical connections between the transducer element on the transducer chip and the electronic circuit chip. This gives a high degree of freedom in designing both the transducer chip and the electronic circuit chip and in particular their electrical terminations.

External electrical connections can be established economically and reliably, and thermal stresses can be avoided with the small size solid state silicon-based condenser microphone of the invention.

The invention uses a separate integrated electronic circuit chip, preferably a CMOS ASIC (Application Specific Integrated Circuit) which can be designed and manufactured separately and independent of the design and manufacture of the transducer portion of the microphone. This is advantageous since the techniques and processes for manufacturing integrated electronic circuit chips are different from those used in manufacturing transducer elements, and each production stage can thus be optimized individually and independent of each other.

BRIEF DESCRIPTION OF THE DRAWINGS

In the following the invention will be explained with reference to the drawings, in which.

Figure 1:
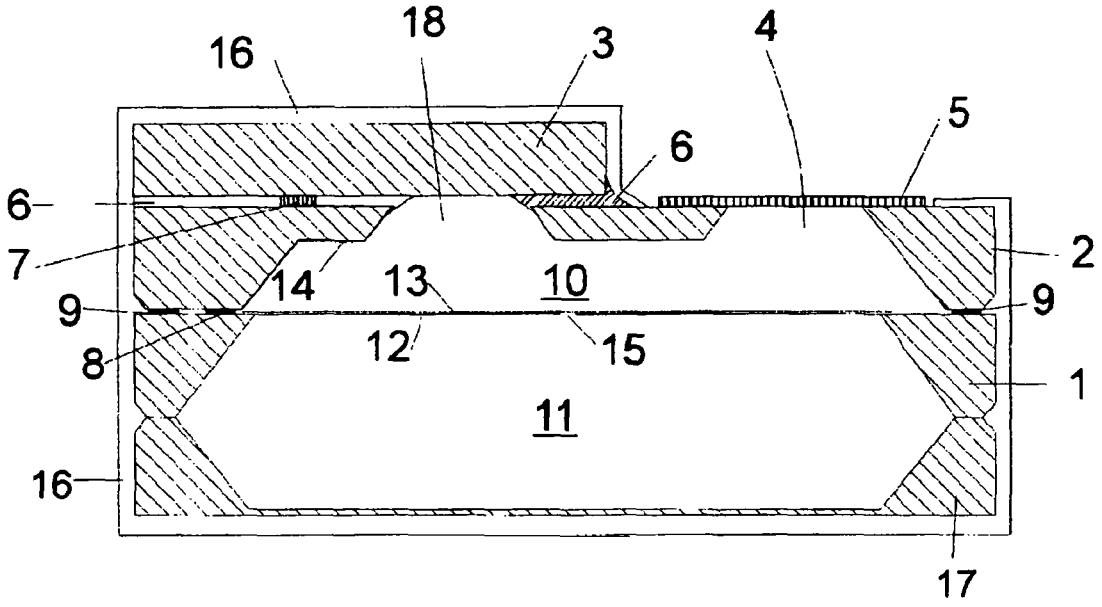
FIG. 1 is a cross section of a microphone according to the invention.

In the figures, for illustrative purposes, dimensions such as material thickness and mutual distances and possibly other proportions are not necessarily drawn to the same scale.

DETAILED DESCRIPTION OF THE INVENTION

The illustrated microphone has the following structure. A silicon transducer chip 1 with a central opening etched therein carries a diaphragm 12 and a backplate 13 covering the central opening in the transducer chip. In this context the term "backplate" means a structural element which is relatively rigid as compared to the associated diaphragm, which in turn is relatively moveable. The backplate can be placed on either side of the diaphragm. The transducer chip with the diaphragm 12 and a backplate 13 are preferably manufactured as described in The copending Danish patent application PA 199800671. The transducer chip 1 and a backchamber-chip 17 having a cavity etched therein, and together the transducer chip 1 and the backchamber-chip 17 form a closed backchamber 11 with the diaphragm 12 forming one wall of the backchamber 11. The diaphragm 12 and the backplate 13 are both electrically conductive or semi-conductive and are arranged parallel and in close proximity to each other and with a well defined air gap in between, so that they form an electrical capacitor.

The backplate 13 has a plurality of perforations 19 making it acoustically transparent, and the diaphragm has a tiny vent hole 15 for equalising the static pressure on both sides of the diaphragm.

An electronic circuit chip 3 having an integrated circuit on a surface thereof is flip chip mounted with its circuit facing the transducer chip 1 and with an intermediate chip 2 between the transducer chip 1 and the electronic circuit chip 3. The intermediate chip 2 has a cavity 10 and a first through going opening 4 and a second through going opening 18 both communicating with the cavity 10. The intermediate chip 2 is secured to the transducer chip 1 by means of an electrically conductive solder ring 9 or by other means.

The electronic circuit chip 3 is secured to the intermediate chip 2 by means of an underfill material 6.

Figure 2:
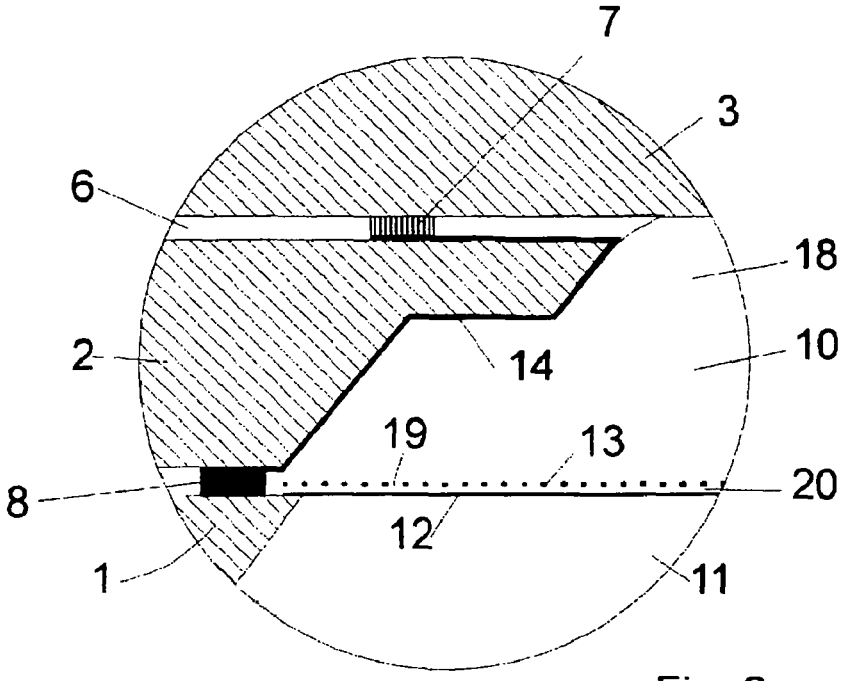
FIG. 2 is an enlarged view of a portion of the microphone in FIG. 1.

The diaphragm 12 and the backplate 13 are electrically connected [Lo] *to* respective ones of solder bumps 8, which connect the diaphragm 12 and the backplate 13 to electrical feedthrough conductors 14 on the surface of the cavity 10 and the opening 18 and further to the upper surface of the intermediate chip 2 where connections to the electronic circuit chip 3 are established via a conventional flip-chip interconnect method e.g. gold studs 7 with conductive adhesive. This is most clearly seen in FIG. 2.

The opening 4 is covered with a filter 5 or a flexible sheet or diaphragm of acoustically transparent material. The whole structure is encapsulated in a polymer encapsulation 16 leaving the filter 5 free.

The function of the above described structure is as follows. The opening 4 functions as a sound inlet, and ambient sound pressure enters through the filter 5 covering the opening 4 to the cavity 10 functioning as a front chamber for the microphone. Through the perforations 19 in the backplate 13 the sound pressure reaches the diaphragm 12. The cavity 11 functions as a backchamber for the microphone. The diaphragm 12 is movable relative to the backplate 13 in response to incident sound. When the diaphragm is moved in response to the incident sound, the electrical capacity of the electrical capacitor formed by the diaphragm 12 and the backplate 13 will vary in response to the incident sound. The circuit on the integrated circuit chip 3 is electrically connected to the diaphragm 12 [And] *and* the backplate 13 via the electrical feedthrough conductors 14, and the circuit is designed to detect variations in the electrical capacity of the capacitor formed by the diaphragm 12 and the backplate 13. The circuit has electrical connections for electrically connecting it to a power supply and other electronic circuitry in eg a hearing instrument.

In the illustrated embodiment the transducer element on the transducer chip is a condenser microphone with a diaphragm and a single backplate. In an alternative embodiment the transducer element has its diaphragm arranged between two backplates. Such a microphone can give balanced output signal which is less sensitive to electrical interference.

What is claimed is:

1. A solid state silicon-based condenser microphone comprising a silicon transducer chip (1) including a backplate (13) and a diaphragm (12) arranged substantially parallel to each other, thereby forming an electrical capacitor, the diaphragm (12) being movable relative to the backplate (13) in response to incident sound, an integrated electronic circuit chip (3) electrically coupled to the transducer chip (1), an intermediate layer (2) fixing the transducer chip (1) to the integrated electronic circuit chip (3) in a spaced relationship, with the transducer chip (1) on a first side of the intermediate layer (2) and the integrated electronic circuit chip (3) on a second side of the intermediate layer (2) opposite the first side, the intermediate layer (2) having a first through going opening (4, 10) between its first side and its second side giving access of sound to the diaphragm.

2. A condenser microphone according to claim 1 wherein the intermediate layer (2) on a surface thereof has electrical conductors (14) electrically connecting the transducer chip (1) to the integrated circuit chip (3).

3. A condenser microphone according to claim 2 wherein the intermediate layer (2) has a second through going opening (18) with a surface on which the electrical conductors (14) electrically connecting the transducer chip (1) to the integrated circuit chip (3) are situated.

4. A condenser microphone according to claim 1 wherein the opening (4) in the intermediate layer is covered with a film (5) sealing the opening (4) on the second side of the intermediate layer (2).

5. A condenser microphone according to claim 1 wherein a cavity (11) is provided in the transducer chip (1) on a side of the diaphragm (12) opposite the intermediate layer (2).

6. A condenser microphone according to claim 5 wherein the cavity (11) is a closed cavity.

7. A condenser microphone according to claim 2 wherein the integrated electronic circuit chip (3) has a surface including electronic circuits with said surface facing the intermediate layer (2).

8. A condenser microphone according to claim 1 wherein the intermediate layer (2) is a silicon-based chip.

*9. A solid state silicon-based condenser microphone, comprising:*

*a silicon-based transducer chip including a backplate and a diaphragm, said diaphragm being movable relative to said backplate in response to incident sound;*

*an integrated electronic circuit chip for receiving an electrical signal from said silicon-based transducer chip corresponding to said incident sound; and*

*an intermediate element fixing said silicon-based transducer chip to said integrated electronic circuit chip in a spaced relationship, said intermediate element including an electrical conductor coupling said integrated electronic circuit chip and said silicon-based transducer chip, said intermediate element further including a cavity and a first through going opening communicating with said cavity, said integrated electronic circuit chip being secured to said transducer chip by flip-chip mounting said integrated electronic circuit chip such that a circuit of said integrated electronic circuit chip faces said intermediate element.*

*10. The condenser microphone of claim 9, wherein said intermediate element includes a feed-through, said feed-through including a feed-through conductor leading to said integrated electronic circuit chip.*

*11. The condenser microphone of claim 10, wherein said electrical conductor coupling said integrated electronic circuit chip and said silicon-based transducer chip is said feed-through conductor.*

*12. The condenser microphone of claim 10, wherein said feed-through is an opening.*

*13. The condenser microphone of claim 9, wherein said intermediate element is a silicon-based chip.*

*14. The condenser microphone of claim 9, wherein said integrated electronic circuit chip is an ASIC.*

*15. The condenser microphone of claim 9, wherein said integrated electronic circuit chip is flip-chip mounted to said intermediate element.*

*16. The condenser microphone of claim 9, wherein said integrated electronic circuit chip is located on one side of said intermediate element and said silicon-based transducer chip is located on an opposing side of said intermediate element.*

* * * * *